United States Patent [19]

Stevenson et al.

[11] 4,291,263

[45] Sep. 22, 1981

[54] AMORTISSEUR WINDING PROTECTION SYSTEM

[75] Inventors: Andrew C. Stevenson; Gordon W. Herzog, both of Peterborough; James C. Murdoch, Cavan, all of Canada

[73] Assignee: Canadian General Electric Company Limited, Toronto, Canada

[21] Appl. No.: 76,214

[22] Filed: Sep. 17, 1979

[30] Foreign Application Priority Data

Mar. 9, 1979 [CA] Canada .................................. 323159

[51] Int. Cl.³ ............................................. H02H 7/08
[52] U.S. Cl. .................................... 318/706; 318/708; 361/29
[58] Field of Search .............. 318/705, 706, 707, 708; 361/29

[56] References Cited

U.S. PATENT DOCUMENTS

| | | | |
|---|---|---|---|
| 1,797,009 | 3/1931 | Matson | 318/706 X |
| 2,169,029 | 8/1939 | Michel | 318/706 |
| 2,308,304 | 1/1943 | Reagan | 318/706 |
| 2,802,161 | 8/1957 | Reagan et al. | 318/706 |
| 3,069,609 | 12/1962 | De Snoo et al. | 318/708 |
| 3,388,305 | 6/1968 | Smith | 318/707 |
| 4,128,792 | 12/1978 | Herzog et al. | 318/706 |

FOREIGN PATENT DOCUMENTS

247985 3/1925 Canada .
564529 10/1958 Canada .
565206 10/1958 Canada .

Primary Examiner—J. V. Truhe
Assistant Examiner—Richard M. Moose
Attorney, Agent, or Firm—Raymond A. Eckersley

[57] ABSTRACT

This invention relates to a system for protecting an amortisseur winding during the starting of a synchronous motor. The system compares the actual slip frequency of the accelerating motor with predetermined slip frequencies. These predetermined slip frequencies are each associated with a timer which measures successive time segments. Each timer is stopped when the actual slip frequency, which decreases as rotor speed increases, is less than the associated predetermined slip frequency. When the timer is stopped a successive timer is started. In this manner the acceleration of the motor is broken up into time segments. The initial timer is started when the motor starts. The final timer is stopped when the rotor field current is applied to bring the motor into synchronism. Should any timer be permitted to have its timed segment expire before being stopped, the motor is shut down. There is also provided a thermal memory which receives information from the expired timer as to its associated slip frequency. This information is used to inhibit the motor from being restarted until the amortisseur winding has cooled. Previous systems were straight timing functions which crudely approximated the motor's acceleration. The present invention provides a system that more closely approximates the motor's non-linear acceleration characteristic.

10 Claims, 1 Drawing Figure

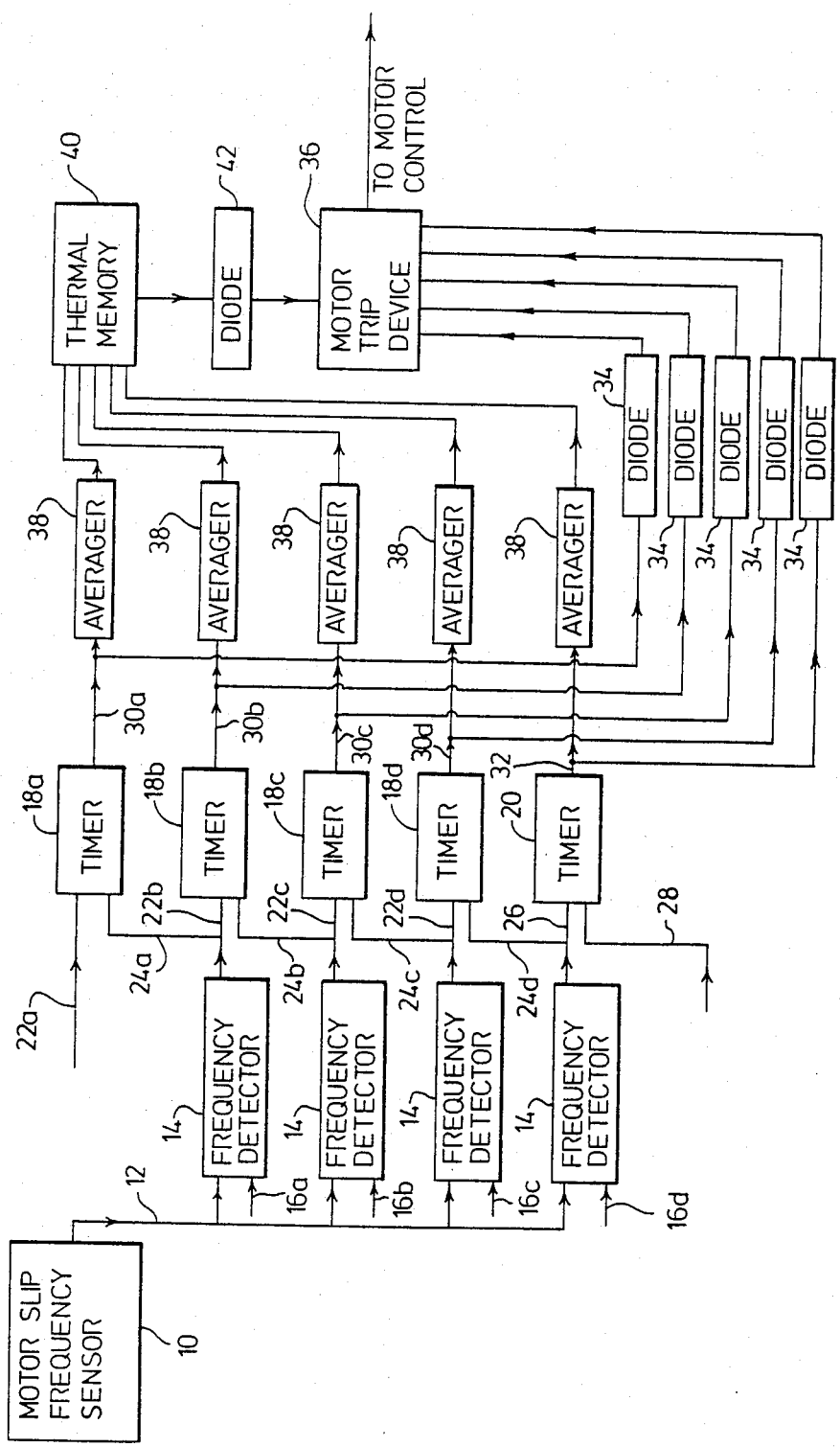

AMORTISSEUR WINDING PROTECTION SYSTEM

This invention relates to a system for protecting an amortisseur winding during the starting of a synchronous motor.

Synchronous motors are commonly started as induction motors by providing an amortisseur winding on the rotor. The amortisseur winding in its simplest form has damper bars embedded in the salient pole faces of the rotor. The damper bars are terminated at their ends by short-circuiting end rings. This type of winding may also be referred to as a squirrel cage winding. The amortisseur winding may also be a wound rotor winding if high torques are required at starting but this involves additional slip rings and brushes.

During the starting of a synchronous motor, the rotor winding is short-circuited. Current is applied to the stator winding which produces a rotating field. This rotating field induces current in the amortisseur winding which rotates the rotor in the same direction as the rotating field. The induced current in the amortisseur winding is largest at rotor standstill and becomes nonexistent when the rotor reaches synchronous speed. The amortisseur winding is designed to withstand this induced current for the relatively short time interval required to accelerate the motor to synchronous speed. A problem arises when the current traversing the amortisseur winding continues beyond the interval of time normally required to accelerate the motor to synchronous speed. When more time is taken than required to accelerate the motor, the amortisseur winding overheats which may damage or destroy the winding. Furthermore, the location of the amortisseur winding embedded on the rotor makes its replacement expensive.

One system used to protect the amortisseur winding during synchronous motor starting is described in Canadian Pat. No. 247,985 issued Mar. 24, 1925 to C. A. Butcher. This system requires the use of a transformer having its primary winding in circuit with the amortisseur winding. The transformer secondary circuit is connected to an inverse time element relay. When current traverses the amortisseur winding for an interval of time exceeding that normally required to accelerate the motor to synchronous speed, the relay operates to stop the motor before the amortisseur winding overheats and becomes damaged or destroyed. This system only involves a straight timing function which is not related to the thermal characteristics of the amortisseur winding. The thermal characteristics of the winding are dependent upon the non-linear acceleration of the synchronous motor. If the motor acceleration is impeded at low speeds near rotor standstill current traversing the winding is larger than if the impediment had occured at speeds near synchronous speed. Because heat losses are proportional to the square of the current, impediments in the motor acceleration at speeds near rotor standstill will overheat and damage the winding more quickly. The straight timing function of the Butcher system has the disadvantage in that it does not account for impediments in the motor acceleration at speeds near rotor standstill which may result in damage to the winding before the relay operates. Another disadvantage of the Butcher system is that the primary winding in circuit with the amortisseur winding must also be embedded in the rotor. Furthermore, additional slip rings and brushes are required to carry the signal back to the secondary winding of the transformer. This makes the use of a transformer somewhat impractical.

Another system that is commonly used to protect the amortisseur winding involves a thermal overload relay together with a resistor-capacitor network connected across the rotor field discharge resistor. If the motor does not accelerate to synchronous speed within a time interval defined by the time constant of the resistor-capacitor network the thermal relay stops the motor. The time constant of this system does not necessarily match all thermal characteristics of the amortisseur winding. This system has the same disadvantage as the Butcher system when the acceleration of the motor is impeded at speeds near rotor standstill which may result in the amortisseur winding being damaged before the relay operates. Another disadvantage of this system is that the thermal overload relay cools off quicker than the amortisseur winding because of the winding's relatively longer cooling time constant. This results in damage to the amortisseur winding in the event of successive motor starts.

It is therefore one feature of this invention to provide an amortisseur winding protection system having a timing function more closely matched to the non-linear acceleration of the motor.

It is an additional feature of the invention to provide a system which protects the amortisseur winding from overheating during successive motor starts.

Briefly, the present invention provides a system for protecting the amortisseur winding during starting of a synchronous motor. The synchronous motor has a time period referred to as "the safe-time period" in which the motor must accelerate up to a speed near synchronous speed so as not to damage the winding. The system provides timing segments which define periods of time within the safe-time period. The system associates with each timing segment a characteristic related to a desired motor speed above which the motor has to accelerate prior to the timing segment expiring. The system senses a characteristic related to achieved motor speed and compares it with the desired characteristic of each timing segment. In the event that achieved motor speed fails to exceed desired motor speed prior to expiration of the desired characteristic's associated timing segment, the system stops the motor. The system is significant because it divides the nonlinear acceleration of the motor into timing segments and determines if the achieved speed of the motor has exceeded the desired speed that the motor is required to exceed by the expiration of each timing segment. The system protects the amortisseur winding from overheating if the motor fails to exceed any desired speed by the expiration of the desired speed's timing segment.

Additionally, in the event that the motor is stopped, information related to the desired characteristic is stored by the system. The information is processed along with any prior stored information to determine an interval of time required by the amortisseur winding to dissipate heat generated therein by aborted motor starts. The system does not permit restarting of the motor until the interval of time has expired.

Therefore, according to one form of the invention there is provided an apparatus for protecting an amortisseur winding during starting of a synchronous motor, the motor having a safe-time within which said motor accelerates to a speed near synchronous speed without damaging the winding, comprising: means sensing a characteristic of achieved motor speed, timing means each providing a plurality of timing segments which define periods of time within the safe-time, comparing means associating with each timing segment a characteristic of desired motor speed above which the motor is required to accelerate prior to the timing segment expiring, the comparing means comparing the achieved characteristic and the desire characteristic of each timing segment so as to detect when achieved motor speed exceeds desired motor speed, and the timing means responsive to the comparing means stopping the motor upon failure of the comparing means to detect the achieved motor speed exceeding the desired motor speed prior to expiration of the desired characteristic's associated timing segment.

In accordance with another form of the invention there is provided an apparatus for protecting an amortisseur winding during starting of a synchronous motor, the motor having a field winding and a safe-time within which the motor accelerates to a speed near synchronous speed, comprising: a sensor sensing flip frequency of the motor; a plurality of timers measuring succeeding timing segments, each timing segment defining a period of time within the safe-time, each timer having an enable and an inhibit terminal, an enabling signal at the enable terminal starting the timer, an inhibit signal at the inhibit terminal terminating the timer, each timer generating a trip signal upon expiring prior to receiving an inhibit signal whereby the trip signal stops the motor; a plurality of frequency detectors each having a characteristic of desired motor speed to which the motor is required to accelerate within a timing segment of an associated timer, the detector generating an inhibit signal to the associated timer in the event that the slip frequency falls below the frequency characteristic of desired motor speed, each detector having associated therewith a succeeding timer to which it transmits an enable signal at the same time as transmitting an inhibit signal to the associated timer; a first enable signal generated in response to the motor starting so as to enable a first timer of the timers, and, a last inhibit signal generated in response to current being applied to said field winding so as to inhibit a last timer of said timers.

For a better understanding of the nature and objects of the invention reference may be had, by way of example, to the accompanying diagrammatic drawing in which an amortisseur winding protection system is shown.

The preferred embodiment of the amortisseur winding protection system is shown in the drawing. Slip frequency sensor 10 senses the slip frequency of the synchronous motor. As the motor accelerates from standstill, the slip frequency of the motor decreases. Sensor 10 comprises an isolated voltage sensor which senses the voltage induced on the field discharge resistor of the motor. The voltage induced on the field discharge resistor has a frequency that corresponds to the slip frequency of the motor. As the motor accelerates, the frequency of the voltage induced on the field discharge resistor decreases. Sensor 10 senses a characteristic related to the achieved motor speed during motor acceleration by sensing the slip frequency. Sensor 10 transmits a signal having the slip frequency of the motor on line 12 to frequency detectors 14.

Each frequency detector 14 compares the slip frequency of the motor with a desired frequency. The desired frequency is a preset value calculated from characteristics of the motor and is introduced to each detector 14 via a respective line of lines 16a, 16b, 16c, and 16d. The detectors output a signal only when the slip frequency of the motor falls below the desired frequency for that detector. Because slip frequency decreases as motor speed increases, each detector transmits its output signal when the motor accelerates to a speed in excess of a speed associated with each detector's desired frequency.

Each desired frequency on lines 16a, 16b, 16c, and 16d is associated with respective timer of timers 18a, 18b, 18c and 18d. Timers 18a through d and timer 20 measure successive segments or periods of time. The timers accumulatively measure a safe-time period within which the motor accelerates from standstill to a speed near synchronous speed without damaging the amortisseur winding. Each desired frequency is chosen so as to correspond to a speed that the motor is required to exceed before the desired frequency's associated timer expires or finishes measuring its successive period of time. Each of timers 18a through d has a respective enable line 22a through 22d and a respective inhibit line 24a through 24d. Timer 20 has an enable line 26 and an inhibit line 28. The timers are started when a signal is present on their enable lines. The timers are halted when a signal is present on their inhibit lines. Timer 18a is commenced by a signal generated on line 22a when the synchronous motor is first started. Timer 20 is halted by a signal generated on line 28 when the field current is applied to the motor at a speed near synchronous speed. The remaining enable and inhibit lines of the timers are controlled by detectors 14. Should any timer be allowed to expire prior to receiving a signal on its inhibit line it will send out a trip signal on its output line. Output lines 30a through 30d and 32 are provided for the timers.

The output line of each detector 14 is connected to an inhibit line of the timer associated with the desired frequency of that detector. The output of each detector 14 is also connected to an enable line of a succeeding timer. In other words, for example, the output of timer 14 having a desired frequency on line 16a has its output connected to inhibit line 24a of timer 18a and to enable line 22b of timer 18b. Timer 18b succeeds timer 18a. Therefore, when a detector 14 outputs a signal it halts the timer associated with the detector's desired frequency and commences the succeeding timer.

Output lines 30 through 30d of timers 18a through 18d and output line 32 of timer 20 are shown broken into two paths. The first path is through diodes 34 to trip device 36. Diodes 34 are light emitting diodes (LED) which provide a visual indication of the speed at which the motor has failed to accelerate above. Motor trip device 36 processes the received signal from the timer output and sends a signal to the motor controller to stop the motor only when a signal from a timer or thermal memory 40 has been received. The second path is through averagers 38, thermal memory 40, and diode 42 to trip device 36. Each averager 38 provides information to memory 40. The information provided corresponds to an average slip frequency. The average slip frequency is determined from the desired frequency associated with the timer that has outputed a signal to the averager and the previous desired frequency. This information is stored in memory 40 for two purposes. The first purpose is to use this information with any previously stored information to accumulatively measure the amortisseur winding temperature. This can be achieved because the slip frequency is related to the thermal characteristics of the winding. The second purpose is to use the information to determine the thermal time constant of the winding. Once determined the memory transmits a signal to diode 42 and trip device 36 which prevents the motor from restarting for a time equivalent to the determined thermal time constant. In this manner the thermal memory protects the amortisseur winding from overheating due to successive motor starts. Diode 42 has a LED diode which gives a visual indication that the thermal memory is responsible for not allowing the motor to be restarted.

The system is described for a normal synchronous motor start in which the motor comes into synchronism without overheating the amortisseur winding. When the motor is started a signal is generated on enable line 22a which starts timer 18a. As the motor speed increases the slip frequency transmitted on line 12 from sensor 10 decreases. When the slip frequency falls below desired frequency on line 16a the first frequency detector 14 transmits an output signal. The output signal is applied to inhibit line 24a which halts timer 18a prior to its time segment expiring. The output signal simultaneously starts timer 18b. As the motor continues to accelerate slip frequency on line 12 drops below the desired frequency on line 16b which causes the second detector to transmit an output signal to lines 24b and 22c. The signal on line 24b halts timer 18b prior to its time segment expiring. The signal on line 22c starts timer 18c. Similarly, as the slip frequency on line 12 drops below the desired frequency on line 16c timer 18c is halted and timer 18d is started. Again, as the slip frequency falls below that of the desired frequency on line 16d, timer 18d is halted and timer 20d is started. Timer 20 is halted prior to its timing segment when a signal is applied to line 28. A signal is applied to line 28 when the field current is applied to the field winding, of the motor.

The system is now described for a synchronous motor start in which the motor fails to accelerate beyond a speed represented by the desired frequency on line 16a. Timer 18a is started by the presence of a signal on line 22a when the motor is first started. Sometime after the initial starting of the motor its acceleration is impeded so that the sensed slip frequency on line 12 does not fall below the desired frequency on line 16a. Hence timer 18a outputs a signal on line 30a prior to receiving a signal on inhibit line 24a. The signal from the timer goes through the uppermost diode 34 to trip device 36 which turns off the motor The signal from the timer is also processed by uppermost average 38 for the memory 40. Memory 40 prevents the motor from restarting until sufficient time has passed for the amortisseur winding to cool.

What we claim as new and desire to secure by Letters Patent of the United States is:

1. A method of protecting an amortisseur winding during starting of a synchronous motor, said motor having a safe-time within which the motor accelerates to a speed near synchronous speed without damaging said winding, the method including the steps of:
    sensing a characteristic of achieved motor speed,
    providing a plurality of timing segments which measure succeeding periods of time within said safe-time,
    associating with each timing segment a characteristic of desired motor speed above which said motor is required to accelerate prior to expiration of said timing segment,
    comparing said achieved characteristic with said desired characteristic of each time segment so as to detect when achieved motor speed exceeds desired motor speed,
    terminating each timing segment when its associated desired characteristic is exceeded by said achieved characteristic, and commencing a timing segment for measuring a succeeding period of time to the period of time measured by said terminating timing segment, and
    stopping said motor in the event that the comparison of said achieved characteristic and said desired characteristic results in the achieved motor speed not exceeding the desired motor speed prior to expiration of the timing segment associated with said desired characteristic.

2. The method as claimed in claim 1 wherein the said achieved and desired characteristics are defined as a function of slip speed.

3. The method of claim 1 wherein said synchronous motor has a field winding, said method including the step of:
    applying a current to said field winding when all of said timing segments have been terminated.

4. The method of claim 1 wherein said achieved and desired characteristics are in terms of slip speed, said method further comprising the steps of:
    storing in response to the step of stopping said motor said desired characteristic of the expire timing segment,
    processing said desired characteristic with any prior stored desired characteristics to generate a control signal proportional to a time period required by said amortisseur windings to dissipate heat generated therein from prior aborted motor starts; and,
    preventing said motor from restarting for the duration of said time period required to dissipate heat generated in said amortisseur windings.

5. An apparatus for protecting an amortisseur winding during starting of a synchronous motor, said motor having a safe-time within which said motor accelerates to a speed near synchronous speed without damaging said winding, comprising:
    means sensing a characteristic of achieved motor speed,
    timing means providing a plurality of timing segments which measure succeeding periods of time within said safe-time,
    comparing means associating with each timing segment a characteristic of desired motor speed above which said motor is required to accelerate prior to said timing segment expiring, said comparing means comparing said achieved characteristic and said desired characteristic of each timing segment so as to detect when achieved motor speed exceeds desired motor speed, and
    said timing means responsive to said comparing means stopping said motor upon failure of said comparing means to detect the achieved motor speed exceeding the desired motor speed prior to expiration of said desired characteristic's associated timing segment.

6. The apparatus of claim 5 wherein each timing segment is terminated in response to said comparing means detecting said achieved characteristic exceeding said desired characteristic and said timing means starting measurement of the next succeeding timing setment.

7. The apparatus of claim 6 wherein said synchronous motor has a field winding, said timing means includes a first time segment started in response to said motor starting, and a last timing segment terminated upon application of a current to said field winding.

8. The apparatus of claim 7 wherein said achieved and desired characteristics are in terms of slip frequency and said apparatus includes a thermal means responsive to said timing means stopping said motor for storing said desired characteristic of the expired timing segment, said thermal means processing said stored desired characteristic with any prior stored desired characteristics so as to obtain a control signal proportional to a time period required by said amortisseur winding to dissipate heat generated therein from prior aborted motor starts, said thermal means preventing said motor from restarting for the duration of said time period required by said amortisseur windings to dissipate heat.

9. An apparatus for protecting an amortisseur winding during starting of a synchronous motor having a field winding and a safe-time within which said motor accelerates to a speed near synchronous speed, said apparatus comprising:
  a sensor sensing slip frequency of the motor,
  a plurality of timers measuring succeeding timing segments, each timing segment defining a period of time within said safe-time, each timer having an enable and an inhibit terminal, an enabling signal at said enable terminal commencing said timer, an inhibit signal at said inhibit terminal terminating said timer, each timer generating a trip signal upon the respective timing segment expiring prior to receiving an inhibit signal whereby said trip signal stops said motor,
  a plurality of frequency detectors each having a frequency characteristic of desired motor speed to which said motor is required to accelerate within a timing segment of an associated timer, said detector generating an inhibit signal to said associated timer in the event that said slip frequency falls below said frequency characteristic of desired motor speed, each detector having associated therewith a succeeding timer to which it transmits an enable signal at the same time as transmitting an inhibit signal to said associated timer,
  a first enable signal generated in response to the motor starting so as to enable a first timer of said timers, and
  a last inhibit signal generated in response to a current being applied to said field winding so as to inhibit a last timer of said timers.

10. The apparatus of claim 9 further including: a plurality of averagers each responsive to a respective timer's trip signal to provide an average slip frequency to a thermal memory, said memory processing said slip frequency signal with prior slip frequency signals to obtain a signal proportional to a timer period required to dissipate heat in said amortisseur winding and said memory stopping said motor from restarting for the duration of said heat dissipating time period.

* * * * *